(12) United States Patent
Hanoch

(10) Patent No.: US 6,390,482 B1
(45) Date of Patent: May 21, 2002

(54) CUTTING TOOL ASSEMBLY

(75) Inventor: Guy Hanoch, Petach Tikva (IL)

(73) Assignee: E.T.M. Precision Tool Manufacturing Ltd., Tefen (IL)

(*) Notice: Subject to any disclaimer, the term of this patent is extended or adjusted under 35 U.S.C. 154(b) by 0 days.

(21) Appl. No.: 09/692,490

(22) Filed: Oct. 20, 2000

(30) Foreign Application Priority Data

Oct. 22, 1999 (IL) .................................................. 132526

(51) Int. Cl.[7] .......................... B23B 31/117; B23P 11/02
(52) U.S. Cl. ........................ 279/102; 29/447; 279/156; 403/273; 409/234
(58) Field of Search ........................... 29/447; 403/273; 279/102, 156, 43–43.2, 46.1–46.3; 409/234; 285/381.1, 381.2

(56) References Cited

U.S. PATENT DOCUMENTS

| 3,678,632 A | * | 7/1972 | Eversole et al. ............ 409/234 |
| 4,133,545 A | * | 1/1979 | Komori ....................... 279/156 |
| 5,280,671 A | | 1/1994 | Marquart ..................... 29/447 |
| 5,311,654 A | | 5/1994 | Cook ........................... 29/447 |
| 5,344,263 A | | 9/1994 | Cook ........................... 409/233 |
| 5,979,911 A | * | 11/1999 | Rinne .......................... 409/234 |
| 6,035,512 A | * | 3/2000 | Cook ........................... 29/447 |

FOREIGN PATENT DOCUMENTS

EP 298273 A * 1/1989 .................. 29/447

* cited by examiner

Primary Examiner—Steven C. Bishop
(74) Attorney, Agent, or Firm—Pennie & Edmonds LLP

(57) ABSTRACT

A tool assembly (10) comprising a male member (12) and a female member (14). The male member having a diameter D1 and being inserted into a variable diameter bore (28) in the front end of the female member (14). The variable diameter bore having a front end having a diameter D2 and a rear end having a diameter D3. In a non-assembled state of the tool assembly, D3 is greater than D2, and D1 is greater than D2 and greater than D3.

20 Claims, 2 Drawing Sheets

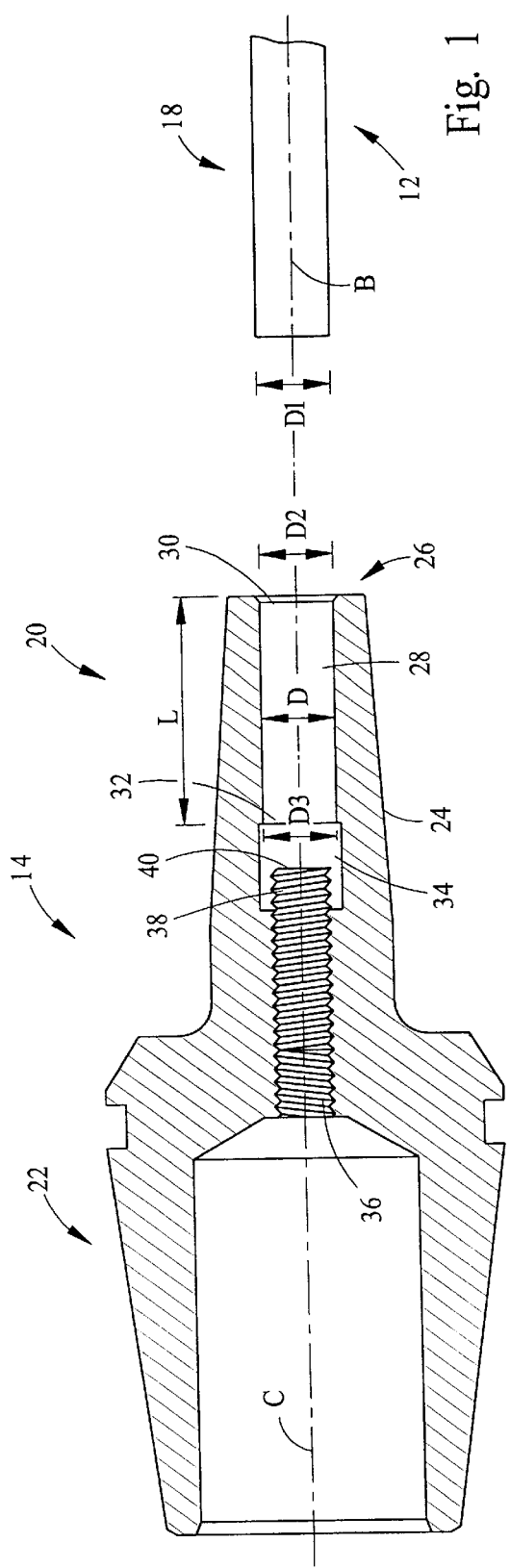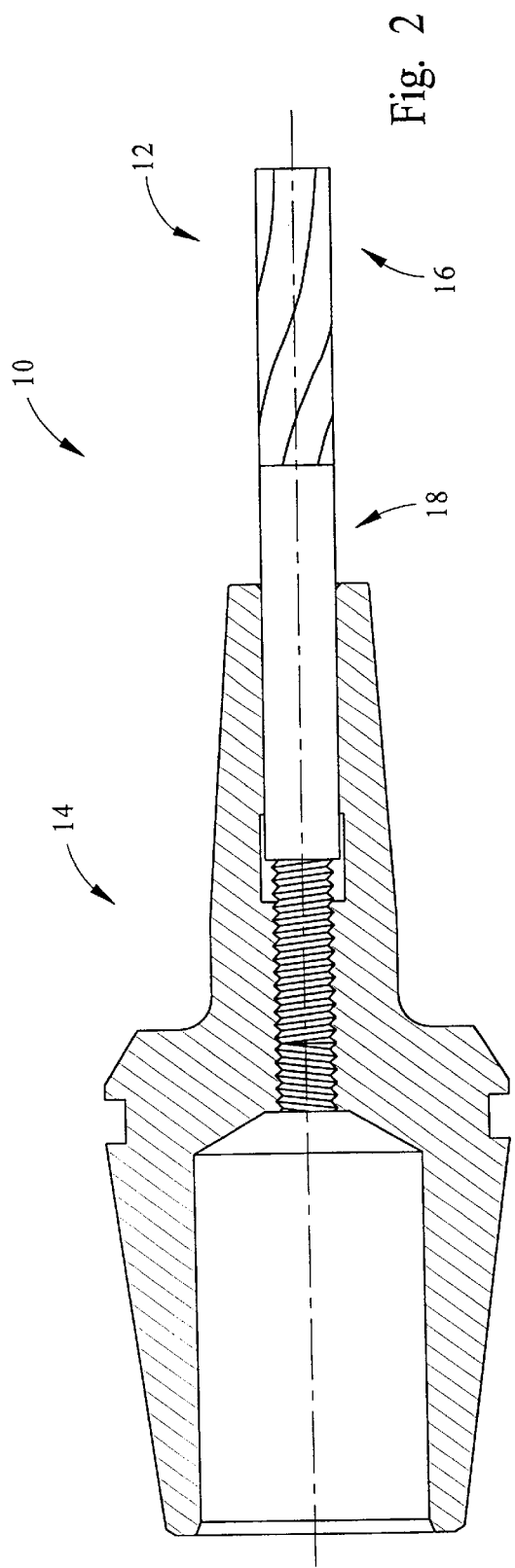

CUTTING TOOL ASSEMBLY

FIELD OF THE INVENTION

The present invention relates to a male and female coupling mechanism whereby male and female members are detachable rigidly assembled by a heat shrinkage process.

BACKGROUND OF THE INVENTION

Tool assemblies employing male and female members that are assembled by a heat shrinkage process are well known. Such an assembly is shown, for example, in U.S. Pat. No. 5,311,654. As seen in FIG. 4 of '654, a tool shank is sidably receivable into a mounting aperture when a heat source such as an induction heater is applied to a sleeve member. The heat causes the effective diameter of the mounting aperture to increase by an amount sufficient to allow the tool shank to be slidably inserted thereinto. Upon removal of the heat source, thermal contraction causes the mounting aperture to form a rigid interface, i.e. a metal-to-metal press fit, between the sleeve member and the tool shank.

With such an assembly, the cutting tool is rigidly maintained within the sleeve member in a concentric manner. However, the gripping force upon the tool shank is greater at the rear oft the mounting aperture than at the front of the mounting aperture since the sleeve member is less rigid at its front end in comparison with its rear end.

It is the object of the present invention to provide a tool assembly that significantly reduces or overcomes, inter alia, the aforementioned disadvantages.

SUMMARY OF THE INVENTION

In accordance with the present invention there is provided a tool assembly comprising a male member and a female member, wherein in a non-assembled state:

the male member has a longitudinal axis B and comprises a rear cylindrical portion having a diameter D1;

the female member has a longitudinal axis C and comprises a variable diameter bore extending rearwardly from a front end of the female member, the variable diameter bore having a front end and a rear end, the front end of the variable diameter bore having a front diameter D2 and the rear end of the variable diameter bore having a rear diameter D3, where D3 is greater than D2, and D1 is greater than D2 and greater than D3;

and wherein in an assembled state:

the rear cylindrical portion of the male member is at least partially retained in the female member and is gripped by the variable diameter bore of the female member such that the front diameter D2 and the rear diameter D3 of the variable diameter bore are equal to the diameter D1 of the rear cylindrical portion of the male member, and the axis B coincides with the axis C.

Preferably, the variable diameter bore of the female member tapers forwardly towards the front end of the female member.

In accordance with a specific application of the present invention, the female member is made of steel and the male member is made of solid carbide and in a non-assembled state the diameter D1 of the rear cylindrical portion of the male member is greater by 0.017 mm. than the front diameter D2 of the variable diameter bore and is greater by 0.012 mm than the rear diameter D3 of the variable diameter bore.

In accordance with a preferred embodiment of the present invention, in a non-assembled state the front diameter D2 of the variable diameter bore is smaller by 0.005 mm than the rear diameter D3 of the variable diameter bore.

In accordance with a specific application, the variable diameter bore has a length dimension L and a diameter dimension D, where the ratio L/D is equal to 3.

Typically, the male member is a solid carbide cutting tool.

Preferably, the rear cylindrical portion of the male member and the variable diameter bore of the female member are ground.

In accordance with one embodiment of the invention, the female member further comprises a locating portion having a screw threaded bore and extending rearwardly from the rear end of the variable diameter bore and having a diameter greater than the rear diameter of the variable diameter bore, the screw threaded bore being produced with a locating screw for fixing the axial location of the rear cylindrical portion of the male member.

In accordance with another embodiment of the invention, the female member further comprises a rear wall located at the rear end of the variable diameter bore.

BRIEF DESCRIPTION OF THE DRAWINGS

For a better understanding of the present invention and to show how the same may be carried out in practice, reference will now be made to the accompanying drawings, in which:

FIG. 1 is a side cross-sectional view of a tool assembly according to the present invention in a non-assembled state;

FIG. 2 is a side cross-sectional view of the tool assembly of FIG. 1 in an assembled state;

DETAILED DESCRIPTION OF THE INVENTION

Figure 3:
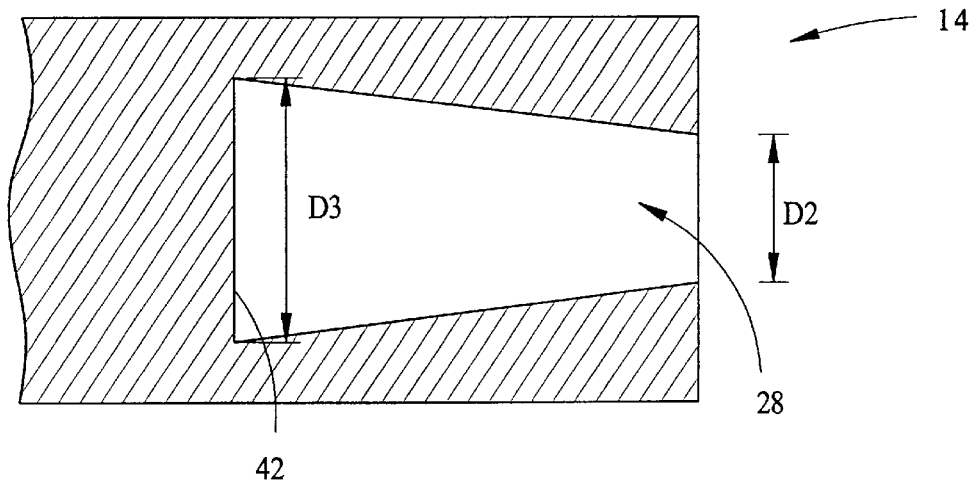
FIG. 3 is a schematic cross-sectional partial view of the female member of another embodiment of a tool assembly according to the present invention.

Attention is first drawn to FIGS. 1 to 3. A cutting tool assembly 10 comprises a cutting tool 12 constituting a male member and a collet 14 constituting a female member. The cutting tool 12 has a longitudinal axis B and comprises a forward cutting portion 16 and a rear shank 18 of cylindrical cross-section having a diameter D1. The cutting tool is generally made of solid carbide and preferably both the cutting portion 16 and the shank 18 are ground.

The collet 14 has a longitudinal axis C and a forward portion 20 for retaining therein the cutting tool 12. The collet 14 has a rear portion 22 for being received in a collet chuck. The rear portion 22 is not described in detail since it is not an essential feature of the present invention.

The forward portion 20 of the collet 14 has a peripheral surface 24 that preferably tapers forwardly toward the front end 26 of the collet 14. A shank receiving bore 28 of variable diameter extends rearwardly from the front end 26 of the collet. The shank receiving bore 28 has a front end 30 and a rear end 32. The front end 30 of the shank receiving bore 28 has a front diameter D2 and the rear end 32 of the shank receiving bore 28 has a rear diameter D3. In a non-assembled state of the cutting tool assembly D3 is greater than D2 and D1 is greater than D2 and greater than D3. Typically, the shank receiving bore 28 is ground.

Preferably, the shank receiving bore 28 tapers forwardly towards the front end 26 of the collet 14. In accordance with a preferred embodiment of the present invention, in a non-assembled state the diameter D1 of the rear cylindrical shank 18 of the male member 12 is greater by 0.017 mm than the front diameter D2 of the shank receiving bore 28 and D1 is greater by 0.012 mm than the rear diameter D3 of the variable diameter bore 28.

In accordance with a preferred embodiment of the present invention, in a non-assembled state the front diameter D2 of the shank receiving bore is smaller by 0.005 mm than the rear diameter D3 of the shank receiving bore.

The rear end 32 of the shank receiving bore 28 is connected to a cylindrical bore 34 having a thread portion 36 in which a screw 38 is threadingly engaged. The front end 40 of the screw 38 constitutes a rear locating surface for the cutting tool 12. Thus, by altering the location of the screw 38 the axial location of the cutting tool 12 in the collet 14 can be altered. If the axial location of the cutting tool 12 with respect to the collet 14 is not of particular importance, the female member can be produced without the screw 38. In another embodiment of the present invention, as shown in FIG. 3, the rear end 32 of the shank receiving bore 28 is provided with a rear wall 42 that serves as a fixed rear locating surface for the cutting tool 12.

The cutting tool assembly is assembled using a heat shrink method. Heat from an external heat unit is applied to the forward portion 20 of the collet 14. The heat causes the forward portion of the collet, and hence the shank receiving bore, to expand. At some stage the front diameter D2 of the shank receiving bore 28 increases by an amount sufficient to allow the shank 18 of the cutting tool 12 to be slidably inserted thereinto. At this stage, the shank 18 of the cutting tool is slidingly inserted into the shank receiving bore 28 till it engages the screw 38. Upon removal of the heat source, the collet 14 cools and thermal contraction causes the shank receiving bore 28 to contract and form a rigid interface, i.e. a surface-to-surface press fit, between the shank receiving bore 28 and the shank 18 of the cutting tool 12 with the surface of the shank receiving bore 28 abutting the shank 18. Since the surfaces of the shank receiving bore 28 and the shank 18 are now in abutment, the front diameter D2 and the rear diameter D3 of the shank receiving bore 28 are equal to the diameter D1 of the shank 18 of the cutting tool 12. The cutting tool 12 is now rigidly connected to the collet 14 in a concentric manner and the axes B and C coincide.

For prior art collets with constant diameter shank receiving bores, a cutting tool gripped by the collet will be gripped with a greater gripping force at the rear of the collet than at the front. Since, in accordance with the present invention the shank receiving bore tapers towards the front end of the cohlet, the gripping force at the front end is greater than that obtained with a constant diameter shank receiving bore, this yields improved stability and improved torque transfer during machining operations.

Figure 4:
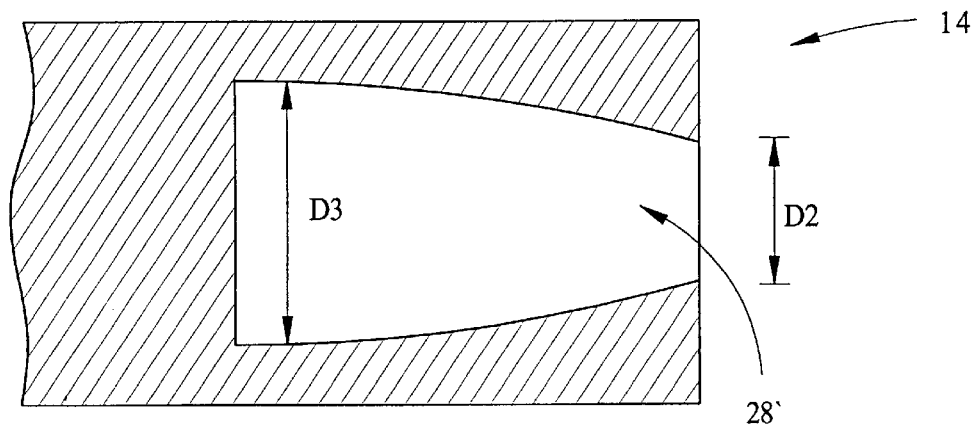
FIG. 4 is a schematic cross-sectional partial view of another embodiment of the female member according to the present invention.
Figure 5:
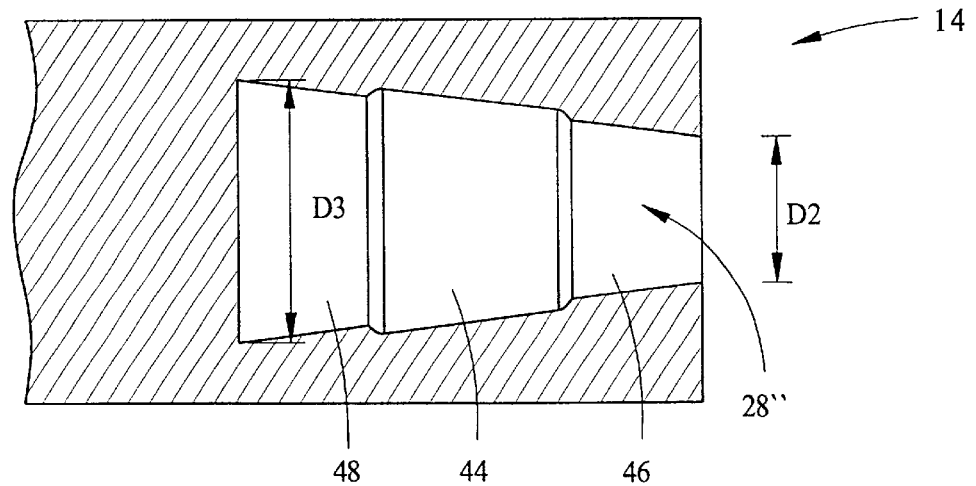
FIG. 5 is a schematic cross-sectional partial view of another embodiment of the female member according to the present invention.

The variable diameter shank receiving bore of the present invention has to have a rear diameter greater than the front diameter, however, it does not necessarily have to taper. Two alternative embodiments are shown in FIGS. 4 and 5. In FIG. 4, the cross-section of the variable diameter bore 28' decreases forwardly, from a diameter D3 to a smaller diameter D2, following a curve, e.g., a parabola. In FIG. 5, the tapered cross-section of the variable diameter bore 28" is interrupted by a symmetrically circumferentially arranged groove 44 thereby creating two spaced apart gripping zones; a forward gripping zone 46 and a rear gripping zone 48.

The male member according to the present invention has been described as being made of solid carbide. Nevertheless, a coupling between a male member and a female member as described above can also be made when the male member is produced from the same material as the female member, for example, tools steel.

However, in such a case, the male member could not be dismantled from the female member by heating the female member since both the male member and the female member have the same coefficient of thermal expansion.

A coupling between a male member and a female member as described above can be used to couple axially more than two members.

Although the present invention has been described to a certain degree of particularity, it should be understood that various alterations and modifications could be made without departing from the spirit or scope of the invention as hereinafter claimed.

What is claimed is:

1. A tool assembly comprising a male member and a female member, wherein in a non-assembled state:
   the male member has a longitudinal axis B and comprises a rear cylindrical portion having a diameter D1;
   the female member has a longitudinal axis C and comprises a variable diameter bore extending rearwardly from a front end of the female member, the variable diameter bore having a front end and a rear end, the front end of the variable diameter bore having a front diameter D2 and the rear end of the variable diameter bore having a rear diameter D3, where D3 is greater than D2, and D1 is greater than D2 and greater than D3;
   and wherein in an assembled state:
   the rear cylindrical portion of the male member is at least partially retained in the female member and is gripped by the variable diameter bore of the female member such that the front diameter D2 and the rear diameter D3 of the variable diameter bore are equal to the diameter D1 of the rear cylindrical portion of the male member, and the axis B coincides with the axis C, and
   the male member is retained in the variable diameter bore of the female bore solely by gripping.

2. A tool assembly according to claim 1, wherein the variable diameter bore of the female member tapers forwardly towards the front end of the female member.

3. A tool assembly according to claim 1, wherein the female member is made of steel and the male member is made of solid carbide and in a non-assembled state the diameter D1 of the rear cylindrical portion of the male member is greater by 0.017 mm than the front diameter D2 of the variable diameter bore and is greater by 0.012 mm than the rear diameter D3 of the variable diameter bore.

4. A tool assembly according to claim 1, wherein in a non-assembled state the front diameter D2 of the variable diameter bore is smaller by 0.005 mm than the rear diameter D3 of the variable diameter bore.

5. A tool assembly according to claim 1, wherein the variable diameter bore has a length dimension L and a diameter dimension D, where the ratio L/D is equal to 3.

6. A tool assembly according to claim 1, wherein the male member is a solid carbide cutting tool.

7. A tool assembly according to claim 1, wherein the rear cylindrical portion of the male member and the variable diameter bore of the female member are ground.

8. A tool assembly according to claim 1, wherein the female member further comprises a locating portion having a screw threaded bore and extending rearwardly from the rear end of the variable diameter bore and having a diameter greater than the rear diameter of the variable diameter bore, the screw threaded bore being provided with a locating screw for fixing the axial location of the rear cylindrical portion of the male member.

9. A tool assembly according to claim 1, wherein the female member further comprises a rear wall located at the rear end of the variable diameter bore.

10. An unassembled tool assembly comprising:
   a male member having a longitudinal axis B, and comprising a rear cylindrical portion having a diameter D1; and
   a female member having a longitudinal axis C, and comprising a variable diameter bore extending rearwardly from a front end thereof, the variable diameter bore having a front end with a front diameter of D2 and rear end with a rear diameter of D3, wherein D1>D3>D2 and the difference between D1 and D2 is less than 0.2 mm.

11. The tool assembly of claim 10, wherein the difference between D1 and D2 is less than 0.02 mm.

12. The tool assembly of claim 10, wherein the variable diameter bore has a linear taper from the rear end of the bore to the front end of the bore.

13. The tool assembly of claim 10, wherein the variable diameter bore has a curved taper from the rear end of the bore to the front end of the bore.

14. The tool assembly of claim 10, wherein the variable diameter bore is stepped between the rear end of the bore and the front end of the bore.

15. The tool assembly of claim 10, wherein the variable diameter bore has a length dimension L and a diameter dimension D, and wherein the ratio L/D is at least 3.

16. The tool assembly of claim 10, wherein the rear cylindrical portion of the male member and the variable diameter bore are ground.

17. The tool assembly of claim 10, wherein the male member and the female members are formed from different materials such that a first thermal coefficient of expansion of the variable diameter bore of the female member is greater than a second thermal coefficient of expansion of the rear cylindrical portion of the male member, and wherein the male member is formed from solid carbide.

18. A tool component comprising:
   a female member having a longitudinal axis C, and comprising a variable diameter bore extending rearwardly from a front end thereof, the variable diameter bore having a front end with a front diameter of D2 and rear end with a rear diameter of D3, wherein D3>D2 and the difference between D3 and D2 is less than 0.02 mm;
   a screw threaded bore extending rearwardly from the rear end of the variable diameter bore; and
   a locating screw having a screw front end, the locating screw operatively engaged within the screw threaded bore and configured to travel along said longitudinal axis C to thereby fix a position of the screw front end within the variable diameter bore, wherein
   the variable diameter bore is ground.

19. The tool component of claim 18, wherein a diameter of the screw threaded bore is greater than D3.

20. The tool component of claim 18, wherein the variable diameter bore has a length dimension L and a diameter dimension D, and wherein the ratio L/D is at least 3.

* * * * *